April 19, 1960   J. MÜLLER   2,933,341
SELF-SUPPORTING CAR BODY
Filed Oct. 31, 1955   2 Sheets-Sheet 1

INVENTOR
JOSEF MÜLLER
BY Dicke and Craig
ATTORNEYS

April 19, 1960 J. MÜLLER 2,933,341
SELF-SUPPORTING CAR BODY
Filed Oct. 31, 1955 2 Sheets-Sheet 2

INVENTOR
JOSEF MÜLLER
BY Dicke and Craig
ATTORNEYS

United States Patent Office 2,933,341
Patented Apr. 19, 1960

2,933,341
SELF-SUPPORTING CAR BODY

Josef Müller, Stuttgart-Wurttemberg, Germany, assignor to Daimler-Benz Aktiengesellschaft, Stuttgart-Untertürkheim, Germany Application October 31, 1955, Serial No. 543,996

Claims priority, application Germany October 30, 1954

12 Claims. (Cl. 296—28)

The present invention relates to self-supporting car bodies, and particularly the type in which such body is made of steel and combined with the car frame so as to form a single unit.

Prior to this invention considerable difficulties have been experienced in preventing the occurrence of strong vibrations, particularly if an excessively heavy structure of the vehicle was to be avoided.

It is one of the objects of the present invention to provide a frame structure for automobiles, and particularly for convertible cars and the like with an open top, in which the shaking vibrations of the car especially may be avoided by the application of relatively simple means and at a low cost of labor and material.

A further object of the present invention is to provide a very rigid construction of a self-supporting car body and frame thereof, particularly in connection with a central longitudinal frame or a bifurcated frame which may serve, for example, as a tunnel for housing the drive shaft and also particularly in cooperation with a transverse wall which closes off the driver's compartment toward the front, or with the dashboard of the car.

Further objects, features, and advantages of the present invention will be apparent from the following detailed description thereof and the accompanying drawings, in which—

Fig. 3 shows a section taken along line 3—3 of Fig. 1; while

Fig. 5 shows a plan view of the car frame as shown in Fig. 4 as seen in a section taken along line 5—5 of Fig. 4; while

Figure 1:
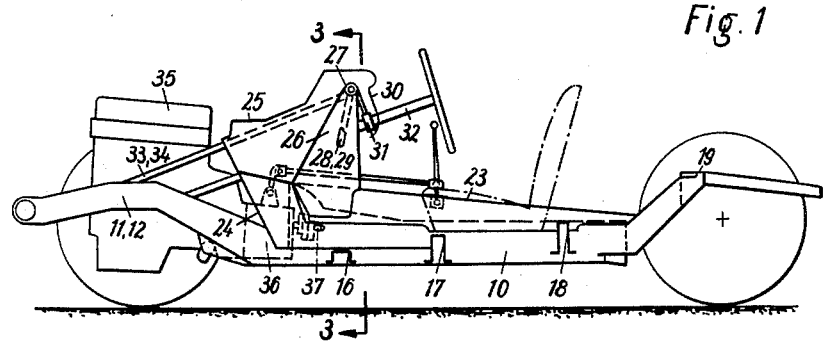
Fig. 1 shows a side view of a car frame with a subsequently mounted reinforcement by means of a turretlike structure, as seen in a section taken along line 1—1 of Fig. 3.
Figure 2:
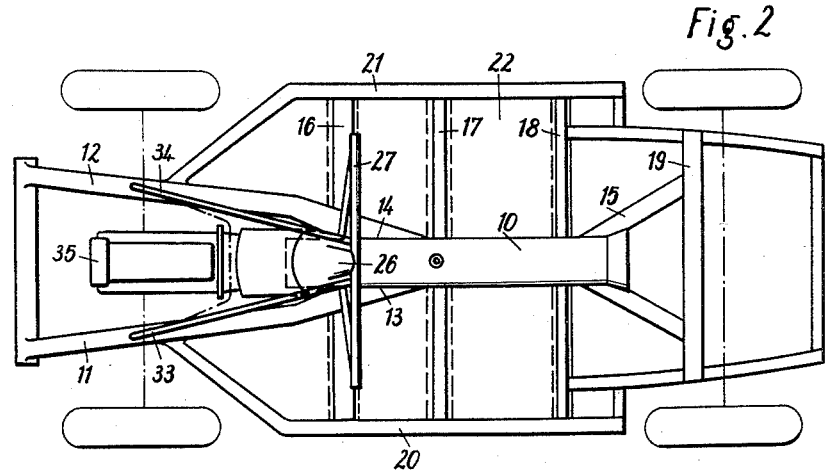
Fig. 2 shows a plan view of the frame as shown in Fig. 1 but with the upper covering walls being omitted therefrom.
Figure 3:
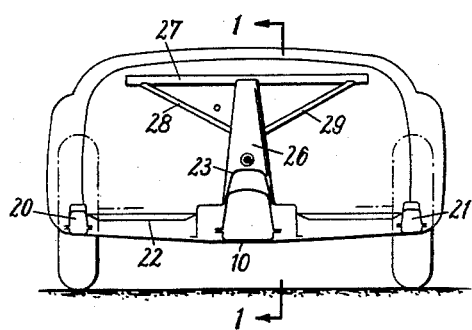

Referring to the drawings, and first particularly to Figs. 1 to 3, the fork ends 11 and 12 of a central longitudinal frame member 10 of a bifurcated shape are welded laterally at the points 13 and 14 to the front end of the frame 10, which as shown in Figure 3 is tubular in character. The rear end of the central frame member 10 may likewise terminate in a fork 15, while cross members 16, 17, 18, 19 connect the central member 10 with lateral frame members 20 and 21 which form the outer limits of the body. A reinforced bottom plate 22 may also be welded to the longitudinal and cross members to connect the same.

The central supporting member 10 is reinforced in an upward direction by an additional U-shaped member 23 so that all the frame members together result in a raised central frame, the front end of which is at least twice as high as it is wide and which gradually lowers down toward the rear. The front end of the central member 10 including the additional member 23, insofar as the latter extends over the level of the fork arms, terminates into an upwardly inclined plate 24, which may form, for example, the foot rest or face plate, and may be welded laterally to the cowling and at its upper end to the upper front wall or closure means which includes front end body structure 25. As shown in Figure 1, this irregularly-shaped member extends rearwardly from plate 24 to the dashboard 30. The front arms 11 and 12 preferably are made of a height lower than the central member 10.

According to the invention, at the point where the fork members 11 and 12 merge with the central frame member 10, the front end of the previously referred to central frame structure comprising that central member carries a turretlike member 26 which has a width at its base, that is, at its point of connection with the frame structure comprising the central member 10, substantially equal thereto, and gradually narrows down in upward direction. A tubular cross arm 27 is welded to the upper end of the turretlike member 26 and braced against the member 26 by struts 28 and 29. Cross arm 27 may be rigidly connected or welded to the dashboard 30 and also at its ends, and particularly in the vicinity of the door hinges, to the cowling. It may also carry an arm 31 for supporting the steering column 32.

The upper end of turret member 26 is furthermore braced against the fork members 11 and 12 by means of struts 33 and 34 which are secured and preferably welded, on the one hand, either to the upper end of a member 26 or to the cross arm 27 and, on the other hand, to the fork members 11 and 12 at a point substantially in line with the front axle suspension.

The engine 35 is mounted in a conventional manner between the fork members 11 and 12, and the gear housing 36 which is combined with the engine to form a driving unit which is disposed within the wider forward end of the central support 10. The driving unit may then be mounted on the frame, on the one hand, on the fork members 11 and 12 approximately at the merging points of struts 33 and 34 and, on the other hand, at the front end of the central support 10 underneath the turret 26. The central support 10 may also enclose the drive shaft 37 leading to the rear axle.

Figure 4:
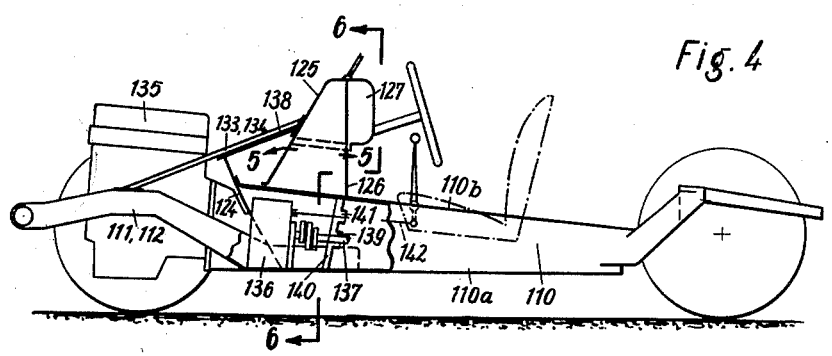
Fig. 4 shows a longitudinal section through a modification of the car frame.
Figure 5:
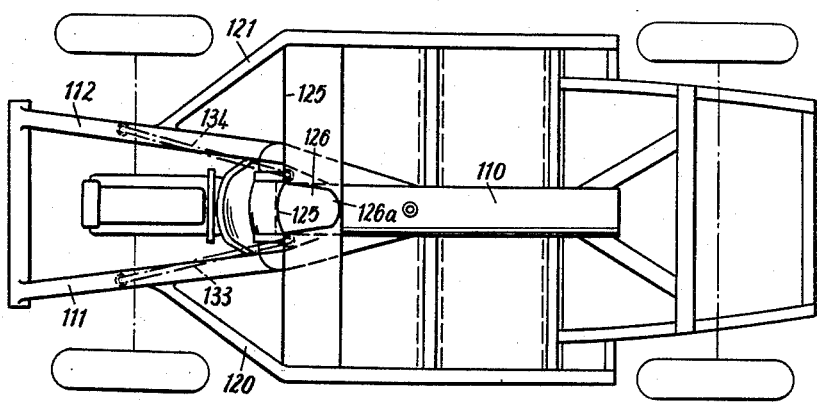
Figure 6:
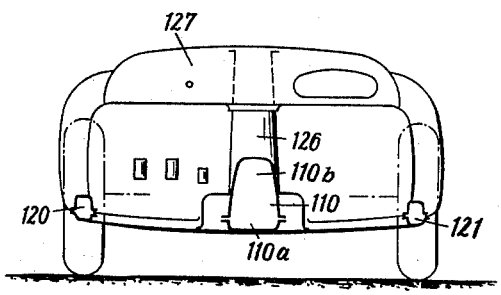
Fig. 6 shows a section taken along line 6—6 of Fig. 4.

The modification of the invention as shown in Figs. 4 to 6 differs from that previously described primarily by the use of a central longitudinal tubular frame member 110 which forms a unitary structure and consists of a lower flat portion 110a and an upper U-shaped portion 100b which has a considerable extent in a vertical direction. The turretlike member 126 consists of a bent U-shaped steel plate 126a which is fitted against and welded to the front wall or closure means 125 so as to be closed off thereby toward the front. The upper cross member 127 is also designed to form a dashboard or storage board and surrounds the turret member 126 by extending from one cowling or side wall of the outer covering to the other. Struts 133 and 134 connect the turret member 126 to the front fork members 111 and 112.

The height of the central frame member 110 also of this embodiment increases from the rear toward the front and same terminates at the front into the foot rest or face plate 124, the upper end of which is welded together with the struts 133 and 134. An additional plate 138 is also welded to struts 133 and 134 at the point of connection with plate 124. Plate 138 together with front wall or closure means 125 and the turretlike member 126, the central frame member 110, and footplate 124 form an additional hollow frame member which increases the stability of the car.

The gear housing 136 is likewise combined with the engine 135 to form a unit and mounted within the widened front end of the central frame member 110. The drive shaft 137 passes through the opening 139 in a transverse plate 140 which reinforces the inside of the central member 110 and has a further opening 141 therein for passing the gear shift rod 142 therethrough.

A lower cross member similar to the cross member 16 of the embodiment shown in Figs. 1 to 3 has been omitted in the modification shown in Figs. 4 to 6 because of the increased strength and rigidity of the upper transverse frame construction.

Since the strong central frame member 110, especially in connection with the turretlike member 126 and the rigid upper cross member 127, provides the car with a very high rigidity against bending and distortion, the lateral longitudinal frame members 120 and 121 may be made of very small height so that the latter, in connection with a low bottom or floor plate of the car, will permit an easy access into the car.

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus full disclosed my invention, what I claim is:

1. In combination with a vehicle having a central tubular longitudinal frame member of a width substantially less than the width of said vehicle, said central tubular longitudinal member being spaced from the sides of said vehicle by distances substantially greater than said width of said frame member, a bifurcated member secured to said frame member near the front end thereof and extending to the front end of said vehicle, and body means forming a portion of a driver's compartment secured to said frame member, said body means substantially defining a closure means for the front of said compartment including a front end body structure, a hollow turretlike member reinforcing said closure means, and having elements constituting a structure of a substantially boxlike cross section, said turretlike member having a base width substantially equal to the width of said frame member and said elements being secured to said frame member with said bifurcated member.

2. In a combination as defined in claim 1, wherein, said frame member is secured to said footplate and terminates thereon, said bifurcated member comprising a pair of arms secured on oppositely facing sides of said frame member and being of lower cross-sectional height than said frame member.

3. In a combination as defined in claim 1, further including a dashboard in said compartment, said dashboard being secured intermediate its ends to said turretlike member, the ends of said dashboard being secured to the side walls of said compartment, said closure means further comprising an upper front wall member secured to said dashboard and together with said dashboard forming a closed hollow cross arm.

4. In combination with a vehicle having a central longitudinal frame structure comprising a central longitudinal frame member, said frame structure being of a width substantially less than the width of said vehicle and being spaced from the sides of said vehicle by distances substantially greater than said width, a bifurcated member secured to said frame member near the front end thereof and extending to the front end of said vehicle, and a body including a driver's compartment secured to said frame member, said compartment having a closure means including a front end body structure, a turretlike member reinforcing said front end body structure and having elements constituting a structure of a substantially boxlike cross section of gradually decreasing width toward its upper end, said turretlike member having a base width substantially equal to the width of said central longitudinal frame member, each of said elements being secured to said frame structure adjacent the point of connection between said frame member and said bifurcated member, said frame structure having a cross-sectional shape of increased height at least substantially within the area of its connection with said turretlike structure, said frame structure gradually decreasing in height from its front toward its rear end.

5. In combination with a vehicle having a central longitudinal frame member, a bifurcated member secured to said frame member near the front end thereof and extending to the front end of said vehicle, and a body including a driver's compartment secured to said frame member, said compartment having a closure means, a turretlike member reinforcing said closure means and having a substantially boxlike cross section of gradually decreasing width toward its upper end, a longitudinal inverted U-shaped member secured to said frame member and increasing the height thereof and gradually decreasing in height from its front toward its rear end, said turretlike member being secured at its base to said inverted U-shaped member substantially within a vertical plane passing through the point of connection between said frame member and said bifurcated member, and said turretlike member having at said base a width substantially equal to said inverted U-shaped member.

6. In combination with a vehicle having a central longitudinal frame member, a bifurcated member secured to said frame member near the front end thereof and extending to the front end of said vehicle, and a body including a driver's compartment secured to said frame member, said compartment having an upper front wall, a turretlike member reinforcing said front wall and having a substantially boxlike cross section and being secured to said frame member substantially at the point of connection thereof with said bifurcated member, a tubular cross arm rigidly secured to said turretlike member near the upper end thereof, said bifurcated member comprising a pair of arms secured to said frame member near the forward end and on opposite sides thereof, and inclined bracing members connecting said arms with said turretlike member near the upper end thereof.

7. In combination with a vehicle having a central longitudinal frame member, a bifurcated member secured to said frame member near the front end thereof and extending to the front end of said vehicle, and a body including a driver's compartment secured to said frame member, said compartment having an upper front wall, a steering column and a cross arm, a turretlike member reinforcing said front wall and having a substantially boxlike cross section and being secured to said frame member substantially at the point of connection thereof with said bifurcated member, said cross arm being rigidly secured to said turretlike member near the upper end thereof, the outer ends of said cross arm being secured to the side walls of said compartment, and said cross arm forming at least a part of a dashboard in said compartment and also bracing said steering column of said vehicle.

8. In combination with a vehicle having a central longitudinal frame member, a bifurcated member secured to said frame member near the front end thereof and extending to the front end of said vehicle, and a body including a driver's compartment secured to said frame member, said compartment having an upper front wall, a turretlike member reinforcing said front wall and having a substantially boxlike cross section and being secured to said frame member substantially at the point of connection thereof with said bifurcated member, a cross arm being rigidly secured to said turretlike member near the upper end thereof, diagonal bracing members connecting said cross arm with a lower portion of said turretlike member, said bifurcated member comprising a pair of arms secured on opposite sides to said frame member near the forward end thereof, and inclined bracing members connecting said turretlike member near the upper end thereof with said arms substantially within a vertical plane passing through the front axle of said vehicle.

9. In combination with a vehicle having a central longitudinal frame member, a bifurcated member secured to said frame member near the front end thereof and extending to the front end of said vehicle, and a body including a driver's compartment secured to said frame member, said compartment having an upper front wall, a turretlike member reinforcing said front wall and having a substantially boxlike cross section and being secured to said frame member substantially at the point of connection thereof with said bifurcated member, and a lower front wall forming a footplate and being upwardly inclined, said frame member being secured to said footplate and terminating thereon, said bifurcated member comprising a pair of arms secured on opposite sides to said frame member near the forward end thereof, inclined bracing members connecting said turretlike member near the upper end thereof with said arms, said lower front wall extending upwardly toward said bracing members and being rigidly secured thereto, and a plate connecting said bracing members with each other and together with said upper and lower front walls and said frame member forming a closed hollow cross arm.

10. In combination with a vehicle having a central longitudinal frame structure of a width substantially less than the width of said vehicle, said frame structure including a central, tubular longitudinal frame member, a bifurcated member secured to said frame member near the front end thereof and extending to the front end of said vehicle, and a body including a driver's compartment secured to said frame structure, said compartment including a closure means, for the front thereof including a front end body structure a hollow turretlike member reinforcing said closure means and having a base width substantially equal to the width of said central longitudinal frame member, said turretlike member having wall means, said wall means being fastened at the lower end thereof to said frame structure adjacent the point of connection between said central, tubular, longitudinal frame member and said bifurcated member, said front end body structure including enclosing wall means forming extensions of said driver's compartment extending forwardly and on each side of said turretlike member, said turretlike member having means of connection to said enclosing wall means for reinforcing said wall means.

11. In combination with a vehicle having a central longitudinal frame structure comprising a central longitudinal frame member, said frame structure being of a width substantially less than the width of said vehicle, a bifurcated member secured to said frame member near the front end thereof and extending to the front end of said vehicle, and a body including a driver's compartment secured to said frame member, said compartment having a closure means, a turretlike member reinforcing said closure means and having elements constituting a structure of a substantially box-like cross section of gradually decreasing width toward its upper end, said turretlike member having a base width substantially equal to the width of said central longitudinal frame member, said elements being secured to said frame structure adjacent the point of connection between said frame member and said bifurcated member, said frame structure having a cross-sectional shape of increased height at least substantially within the area of its connection with said turretlike member, said frame structure gradually decreasing in height from its front toward its rear end, the height of said frame structure at its front end being substantially twice as large as its width and gradually decreasing toward its rear end to a height substantially equal to its width.

12. In combination with a vehicle having a central tubular longitudinal frame member of a width substantially less than the width of said vehicle, a bifurcated member secured to said frame member near the front end thereof and extending to the front end of said vehicle, and body means forming a portion of a driver's compartment secured to said frame member, said body means substantially defining a closure means, a turretlike member reinforcing said closure means, and having elements constituting a structure of a substantially boxlike cross section, said turretlike member having a base width substantially equal to the width of said frame member and said elements being secured to said frame member adjacent the point of connection of said frame member with said bifurcated member, said bifurcated member comprising a pair of arms secured on opposite sides to said central frame member, lateral longitudinal frame members having their front ends secured to said arms and their rear ends connected to said central member, and a bottom plate rigidly securing said lateral members to said central member.

References Cited in the file of this patent

UNITED STATES PATENTS

| 1,189,284 | Nelson | July 4, 1916 |
| 2,111,563 | Kliesrath | Mar. 22, 1938 |
| 2,730,185 | Giacosa | Jan. 10, 1956 |

FOREIGN PATENTS

| 553,391 | Germany | June 25, 1932 |
| 865,508 | France | Feb. 24, 1941 |
| 719,869 | Great Britain | Dec. 8, 1954 |

U.S. corresponding, 2,756,835, July 31, 1956